United States Patent
Lu et al.

(10) Patent No.: US 9,537,192 B2
(45) Date of Patent: Jan. 3, 2017

(54) BATTERY WITH LOW TEMPERATURE MOLTEN SALT (LTMS) CATHODE

(75) Inventors: Yuhao Lu, Vancouver, WA (US); Sean Andrew Vail, Vancouver, WA (US); Gregory M. Stecker, Vancouver, WA (US); Jong-Jan Lee, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1024 days.

(21) Appl. No.: 13/564,015

(22) Filed: Aug. 1, 2012

(65) Prior Publication Data

US 2014/0037999 A1    Feb. 6, 2014

(51) Int. Cl.
| | |
|---|---|
| H01M 12/08 | (2006.01) |
| H01M 2/40 | (2006.01) |
| H01M 4/58 | (2010.01) |
| H01M 10/39 | (2006.01) |
| H01M 8/04276 | (2016.01) |
| H01M 8/04 | (2016.01) |

(52) U.S. Cl.
CPC ............... *H01M 12/08* (2013.01); *H01M 2/40* (2013.01); *H01M 4/58* (2013.01); *H01M 8/04276* (2013.01); *H01M 10/399* (2013.01); *Y02E 60/50* (2013.01)

(58) Field of Classification Search
CPC .................................................. H01M 10/399
See application file for complete search history.

(56) References Cited

U.S. PATENT DOCUMENTS

| | | | |
|---|---|---|---|
| 4,063,005 A * | 12/1977 | Mamantov et al. | 429/103 |
| 4,842,963 A | 6/1989 | Ross, Jr. | |
| H1544 H * | 6/1996 | Miles | 429/108 |
| 2010/0047671 A1* | 2/2010 | Chiang et al. | 429/50 |
| 2011/0189520 A1 | 8/2011 | Carter et al. | |

(Continued)

FOREIGN PATENT DOCUMENTS

DE    WO 2010094657 A1 *    8/2010    ............ H01M 8/188

OTHER PUBLICATIONS

Table 2-1, Physical Properties of the Elements and Inorganic Compounds, from Perry's Chemical Engineers' Handbook, 8th Edition (2008). [Physical property data from Table 2-1 for: manganese chloride, ferric chloride, cobalt nitrate, nickel nitrate.]*

(Continued)

*Primary Examiner* — Barbara Gilliam
*Assistant Examiner* — Robert S Carrico
(74) *Attorney, Agent, or Firm* — Law Office of Gerald Maliszewski; Gerald Maliszewski

(57) ABSTRACT

A battery is provided with an associated method for transporting metal-ions in the battery using a low temperature molten salt (LTMS). The battery comprises an anode, a cathode formed from a LTMS having a liquid phase at a temperature of less than 150° C., a current collector submerged in the LTMS, and a metal-ion permeable separator interposed between the LTMS and the anode. The method transports metal-ions from the separator to the current collector in response to the LTMS acting simultaneously as a cathode and an electrolyte. More explicitly, metal-ions are transported from the separator to the current collector by creating a liquid flow of LTMS interacting with the current collector and separator.

16 Claims, 3 Drawing Sheets

(56) References Cited

U.S. PATENT DOCUMENTS

| | | | |
|---|---|---|---|
| 2011/0223460 A1* | 9/2011 | Farmer | H01M 2/1646 |
| | | | 429/104 |
| 2012/0115069 A1* | 5/2012 | Noack | H01M 8/188 |
| | | | 429/498 |
| 2014/0210422 A1* | 7/2014 | Bhavaraju | H01M 10/399 |
| | | | 320/137 |

OTHER PUBLICATIONS

Werth et al., "The Sodium Chloride Battery", Proc. Symp. Energy Storage (1976), pp. 198-205.*

"Antimony chloride" on ChemSpider.com. Accessed on: Dec. 13, 2015. >http:// www.chemspider.com/Chemical-Structure.23199.html<.*

SciFinder Abstract for Mamantov et al., Proceedings of the Intersociety Energy Conversion Engineering Conference, vol. 15, Iss. 1, pp. 569-574 (1980).*

K.M. Abraham, Z. Jiang, A polymer electrolyte-based rechargeable lithium/oxygen battery, Journal of the Electrochemical Society, 143 (1996) 1-5.

* cited by examiner

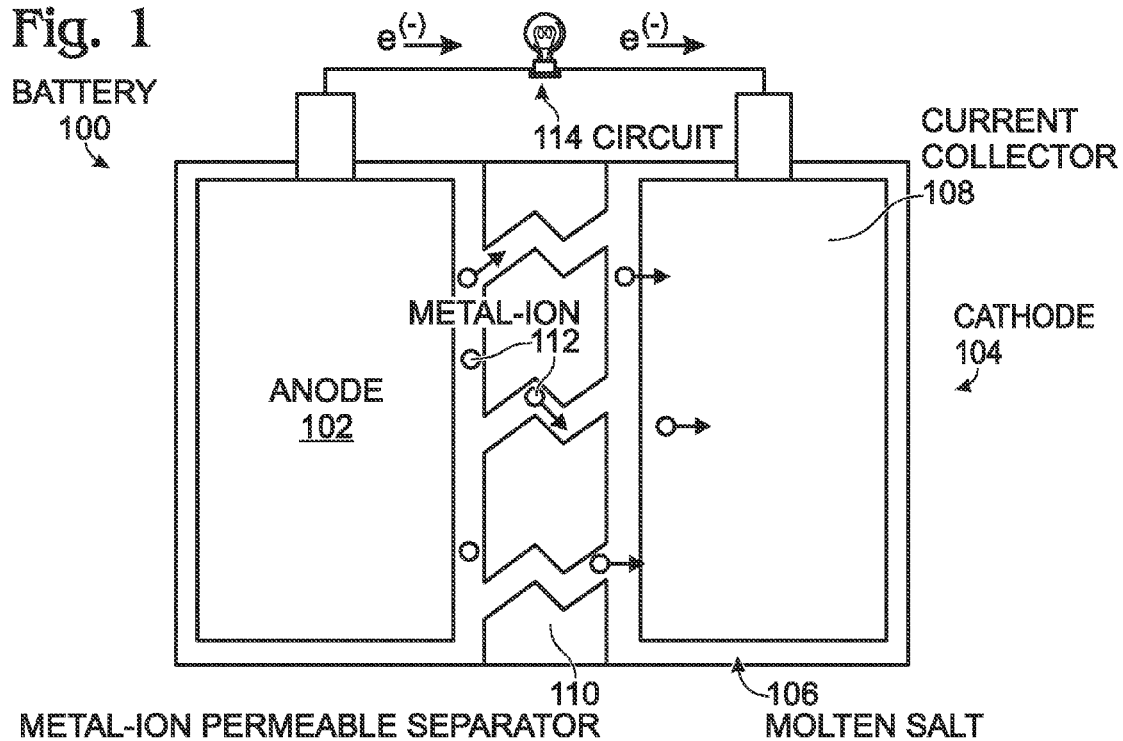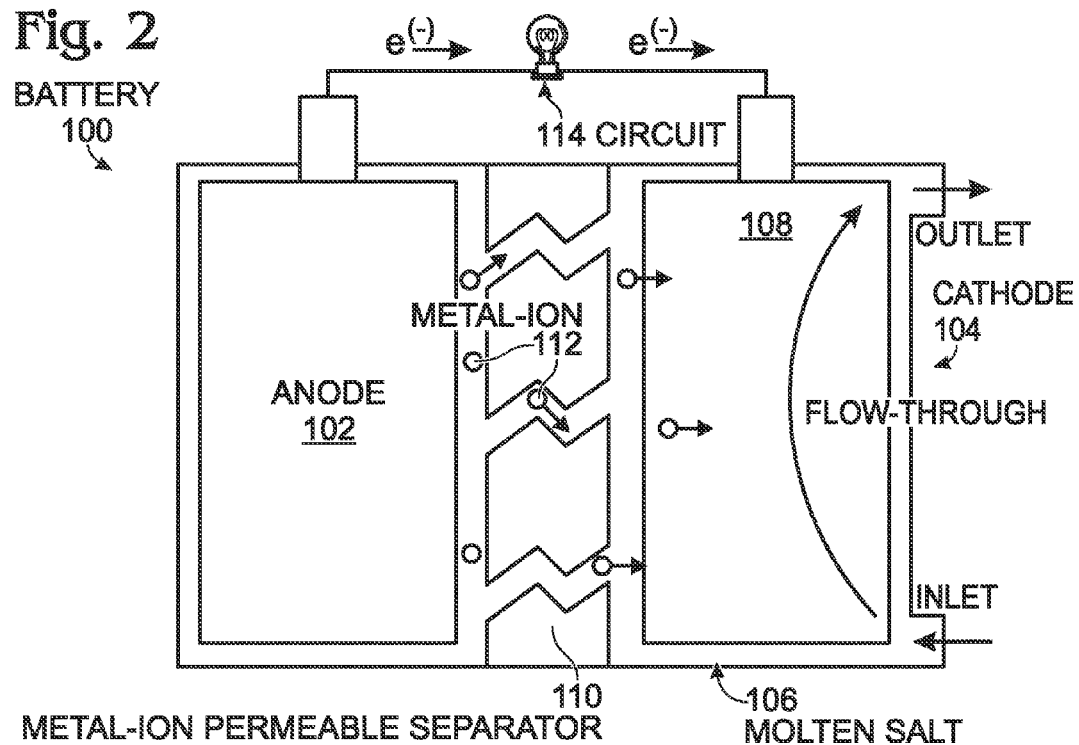

BATTERY WITH LOW TEMPERATURE MOLTEN SALT (LTMS) CATHODE

BACKGROUND OF THE INVENTION

1. Field of the Invention

This invention generally relates to electrochemical cells and, more particularly, to a battery that uses a low temperature molten salt (LTMS) as part of the cathode.

2. Description of the Related Art

A battery is an electrochemical device in which ions and electrons commute between an anode and a cathode to realize electrochemical reactions. The voltage and capacity of the battery are determined by its respective electrode materials. In general, metals anode materials promote a high voltage in the battery, while their low molecular weights provide a large capacity. For example, lithium has the most negative potential of $-3.04$ V vs. $H_2/H^+$ and the highest capacity of 3860 mAh/g. High voltage and large capacity lead to an overall high energy for the battery. In addition, sodium, potassium, magnesium, nickel, zinc, calcium, aluminum, etc. are good candidates as anode materials in metal-ion batteries.

The state-of-the-art cathode materials focus on the metal-ion host compounds. Metal-ions can be extracted from the interstitial spaces of the electrode materials in the charge process, and inserted into the materials during the discharge process. However, it is worth noting that the charge/discharge process severely distorts the lattice of the materials, which essentially destroys their structures following several cycles. Moreover, these cathode materials can only provide less than one tenth the capacity of the metal anode materials. Therefore, new cathode materials need to be developed in order to both match the higher capacities of the anode materials and enable longer cycle lives for the metal-ion batteries.

In 1996, Abraham and Jiang reported a polymer electrolyte-based rechargeable lithium/oxygen battery in which oxygen was used as the cathode material [K. M. Abraham, Z. Jiang, A polymer electrolyte-based rechargeable lithium/oxygen battery, Journal of the Electrochemical Society, 143 (1996) 1-5]. Oxygen (in air) continuously flows into the battery and provides a very high specific energy of 5200 Wh/kg. Nevertheless, the oxygen cathode has several disadvantages. Firstly, electro-catalysts were used in the batteries to reduce the kinetic barrier for the oxygen reactions. Secondly, the sluggish electrochemical reactions of oxygen produce a large overpotential in the lithium/air battery. Thirdly, the cathode of the lithium/air battery has to remain open to allow air access. Similarly, an oxygen cathode has also used in zinc-air batteries [Philip N. Ross, Jr., Zinc electrode and rechargeable zinc-air battery, U.S. Pat. No. 4,842,963].

In 2011, Lu and Goodenough revealed an aqueous cathode for a lithium-ion battery [Yuhao Lu, John B. Goodenough, Youngsik Kim, "Aqueous cathode for next-generation alkali-ion batteries", Journal of the American Chemical Society, 133 (2011) 5756-5759]. They used aqueous solutions of water-soluble redox couples (for example, $Fe(CN)_6^{3-}/Fe(CN)_6^{4-}$) as the cathode. The lithium/aqueous cathode battery operated at ca. 3.4 volts in an ambient environment. The battery demonstrated a small overpotential, a high coulombic efficiency, and a long cycle life. However, water is an inert material in the electrochemical system, which reduces the specific capacity of the cathode. Although the design of a lithium/flow-through cathode battery can increase the capacity and energy, its volume must necessarily be large.

During the same period, Carter and Chiang disclosed a patent that described the use of a flowable semi-solid composition (slurry) as the electrode materials in batteries [William C. Carter, Yet-Ming Chiang, High energy density redox flow device, US 2011/0189520]. The electrode included at 5% vol % of the total volume, active materials to store energy. The inventors demonstrated an example where the cathode slurry of 25 vol % lithium cobalt oxide, 0.8 vol % carbon black, 73.2 vol % electrolyte was tested in a lithium/slurry cathode battery. The composition of slurry produced a suitable viscosity for the device design. Only 0.36 Li-ion can reversibly insert/deinsert into/from a $LiCoO_2$ molecule between 2 V and 4.5 V because there is a small contact area between the solid particles and the current collector. Moreover, it's inevitable that the solid particles have to suffer considerable strain when the ions insert into their lattice, which restricts the cycle life of the electrode material. According to the data, it can be determined that the concentration of the active material is 7.2 M while the specific capacity of the slurry is 69.22 Ah/L. With respect to the molten salt of $Fe(NO_3)_3 \cdot 9H_2O$, for example, its capacity is 98.4 Ah/L (90% of the theoretical capacity) which is larger than that of the slurry electrode materials. In addition, the slurry electrode has a high viscosity that causes a significant loss of parasitic energy. Therefore, the slurry battery exhibits a low energy efficiency.

Although the appearance of molten sodium batteries does not adequately address the issues and challenges associated with cathode materials for metal-ion batteries, they are mentioned in order to adequately distinguish molten sodium batteries from the low-temperature molten salt cathode described in detail below. The rechargeable molten sodium batteries are mainly either sodium-sulfur batteries or sodium-nickel chloride (ZEBRA) batteries. A sodium-sulfur battery consists of molten sodium at the anode and molten sulfur at the cathode. In the discharge process, sodium ions transport from the anode to cathode and form $Na_2S_4$. The voltage of the battery is ca. 2 volts. Similar to the Na—S battery, a ZEBRA battery uses the molten sodium as anode, but the molten $NiCl_2$ acts as the cathode. The electrochemical reaction in the battery is $2NaCl+Ni \leftrightarrows NiCl_2+2Na$. Its operating voltage is around 2.4 volts. One significant problem is that the molten salt batteries of Na—S and Na—$NiCl_2$ have to operate at a high temperature (270° C.) in order to maintain the salts in the melt state.

It would be advantageous if a battery could be fabricated with a cathode that included a salt that remains molten at low temperatures.

SUMMARY OF THE INVENTION

Disclosed herein is the use of low temperature molten salts (LTMS) as cathode materials in metal-ion batteries. Uniquely, the melting points of the salts are below 150° C. Their low melting points make these salts significantly different from the salts used in Na—S and Na—$NiCl_2$ batteries. Unlike conventional ion-host materials (e.g. $LiCoO_2$, $LiMn_2O_4$, $LiFePO_4$, etc.), metal-ions cannot destroy the structures of molten salts during the charge/discharge process. For example, the intercalation of $Li^+$-ions leads to lattice distortion of $Li^+$-host materials, which deteriorates the stability of the materials and limits cycle lives. However, molten salts are liquids that remain strain-free even upon reaction with the metal-ions.

Accordingly, a method is provided for transporting metal-ions in a battery using a LTMS. The battery comprises an anode, a cathode formed from a LTMS having a liquid phase at a temperature of less than 150° C., a current collector submerged in the LTMS, and a metal-ion permeable separator interposed between the LTMS and the anode. The method transports metal-ions from the separator to the current collector in response to the LTMS acting simultaneously as a cathode and an electrolyte. More explicitly, metal-ions are transported from the separator to the current collector by creating a liquid flow of LTMS interacting with the current collector and separator.

In one aspect, the battery cathode includes an internal compartment including the separator and current collector, and a connected reservoir. Then, creating a liquid flow of LTMS includes flowing LTMS between the internal compartment and the reservoir. More explicitly, LTMS flows between the internal compartment and the reservoir in response to the LTMS discharging below a minimum threshold voltage. Alternatively, LTMS flows between the internal compartment and the reservoir in response to the LTMS charging above a maximum threshold voltage.

Additional details of the above-described method and a battery with a LTMS cathode are provided below.

BRIEF DESCRIPTION OF THE DRAWINGS

FIG. 1 is a schematic block diagram of a battery with a low temperature molten salt (LTMS) cathode.

FIG. 2 is a schematic block diagram depicting a first variation of the LTMS battery of FIG. 1.

DETAILED DESCRIPTION

Figure 3:
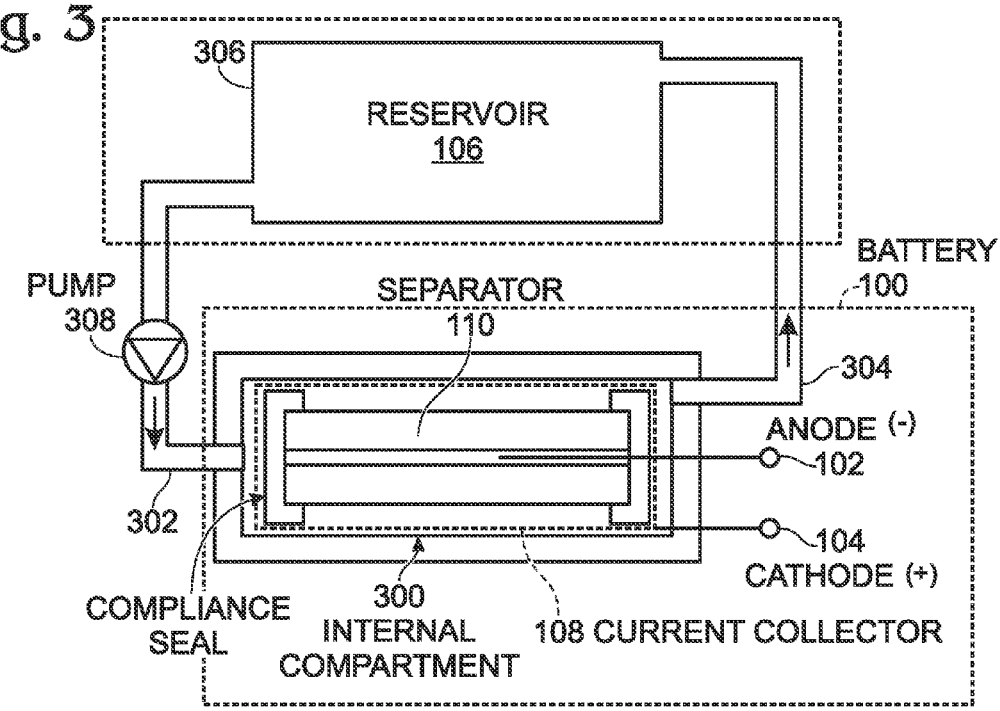
FIG. 3 is a schematic block diagram depicting the LTMS battery of FIG. 2 in greater detail.

FIG. 1 is a schematic block diagram of a battery with a low temperature molten salt (LTMS) cathode. The battery 100 comprises an anode 102 configured to accept and release metal-ions. A cathode 104 is formed from a LTMS 106 having a liquid phase at a temperature of less than 150° C. A current collector 108 is submerged in the LTMS 106. A metal-ion permeable separator 110 is interposed between the LTMS 106 and the anode 102. The LTMS 106 is, simultaneously with being included with the cathode 104, an electrolyte transporting metal-ions 112 from the separator 110 to the current collector 108. The LTMS 106 comprises a redox couple, including a reducing agent and its corresponding oxidizing agent.

Some examples of LTMSs include $Mn(NO_3)_3 \cdot 6H_2O$, $Mn(NO_3)_2 \cdot 4H_2O$, $MnCl_2 \cdot 4H_2O$, $FeBr_3 \cdot 6H_2O$, $KFe(SO_4)_2 \cdot 12H_2O$, $FeCl_3 \cdot 6H_2O$, $Fe(NO_3)_3 \cdot 9H_2O$, $FeCl_3 \cdot 2H_2O$, $Fe(NO_3)_2 \cdot 6H_2O$, $FeSO_4 \cdot 7H_2O$, $CoSO_4 \cdot 7H_2O$, $Co(NO_3)_2 \cdot 6H_2)$, $Ni(NO_3)_2 \cdot 6H_2O$, $Cd(NO_3)_2 \cdot 4H_2O$, and $Cd(NO_3)_2 \cdot H_2O$. However, this is not an exhaustive list of useful salts.

In one aspect, the LTMS 106 is diluted with a salt including a metal-ion compound to decrease its melting point. The metal-ion compound salt also provides metal-ions to facilitate the charge/discharge reactions. For example, the metal-ion compound salt may be $MNO_3$, $MCl$, or $M_2SO_4$, where M represents a metal. That is, the metal-ion compound salt may be $LiNO_3$, $LiCl$ or $Li_2SO_4$ for a battery with a Li metal anode 102, or $NaNO_3$, $NaCl$ or $Na_2SO_4$ for a battery with a Na metal anode 102. Once again, it should be understood that this is not an exhaustive list of metal-ion compound salts or anode materials.

The battery consists of the anode 102 and the cathode 104 separated by a metal-ion permeable separator 110 that prevents a short circuit in the battery. In order to collect current for the cathode 104, a porous or mesh electron-conductor with a high surface area is used as the current collector 108. In the discharge process, metal-ions 112 are released from the anode 102 and pass through the metal-ion permeable separator 110. The electrons move from the anode 102 to cathode 104 through the external circuit 114 and generate the electric power. On the cathode side, the redox couples in the LTMS 106 obtain the electrons and are reduced. The voltage of the battery 100 is determined by the potential difference between the cathode 104 and anode 102.

FIG. 2 is a schematic block diagram depicting a first variation of the LTMS battery of FIG. 1. In this aspect, the cathode 104 is a flow-through cathode, with a liquid flow of LTMS 106 interacting with the current collector 108 and separator 110. The molten salts 106 can be continuously fed into the cathode 104 to increase the capacity and energy of the battery 100. For example, the capacities of lithium and sodium are 3860 mAh/g and 1166 mAh/g, respectively. The state-of-the-art cathode materials cannot match the high capacities for these materials. However, the strategy of the flow-through LTMS cathode can alleviate this problem and allow the battery to provide a higher capacity.

More explicitly, an anode made from a metal (e.g. Li or Na) has a very high charge density. The cathode has lower charge density than the anode. If the cathode and anode have similar weights, the cathode can be depleted with the anode still having a significant unused charge density. With the flow-through design, after the cathode (the LTMS in the internal compartment) is depleted, it can be pumped away and injected with new LTMS from the reservoir. Then, the battery 100 can continue to discharge. Once the catholyte (LTMS) solution in the reservoir 306 also discharged, the flow-through charge process can be repeated. Again, the cathode solution (LTMS) is pumped away once the charge is completed, and new depleted catholyte is injected from the reservoir 306.

FIG. 3 is a schematic block diagram depicting the LTMS battery of FIG. 2 in greater detail. The flow-through cathode 104 comprises an internal compartment 300 including the separator 110 and current collector 108, an input flow port 302, and an output flow port 304. A reservoir 306 connected to the input 302 and output 304 flow ports. Note: although only single input and single output port are shown, it should be understood that there may be a plurality of such ports. Likewise, there may be a plurality of reservoirs. In one aspect, the flow of LTMS is maintained as a result of a temperature differential between the LTMS 106 in the internal compartment 300 and the LTMS in the reservoir 306. Alternatively as shown, a pump 308 connected between the internal compartment 300 and the reservoir 306 to supply a flow of LTMS 106.

In one aspect, the pump 308 exchanges LTMS 106 between the internal compartment 300 and reservoir 306 in response to the LTMS in the internal compartment becoming discharged below a minimum threshold voltage. Alternatively, the pump 308 exchanges LTMS 106 between the internal compartment 300 and reservoir 306 in response to the LTMS in the internal compartment becoming charged above a maximum threshold voltage. In another aspect not shown, the reservoir may include a heat exchanger for the purpose of maintaining the temperature of the LTMS at a desired temperature, or to increases or decrease the LTMS temperature.

Figure 4:
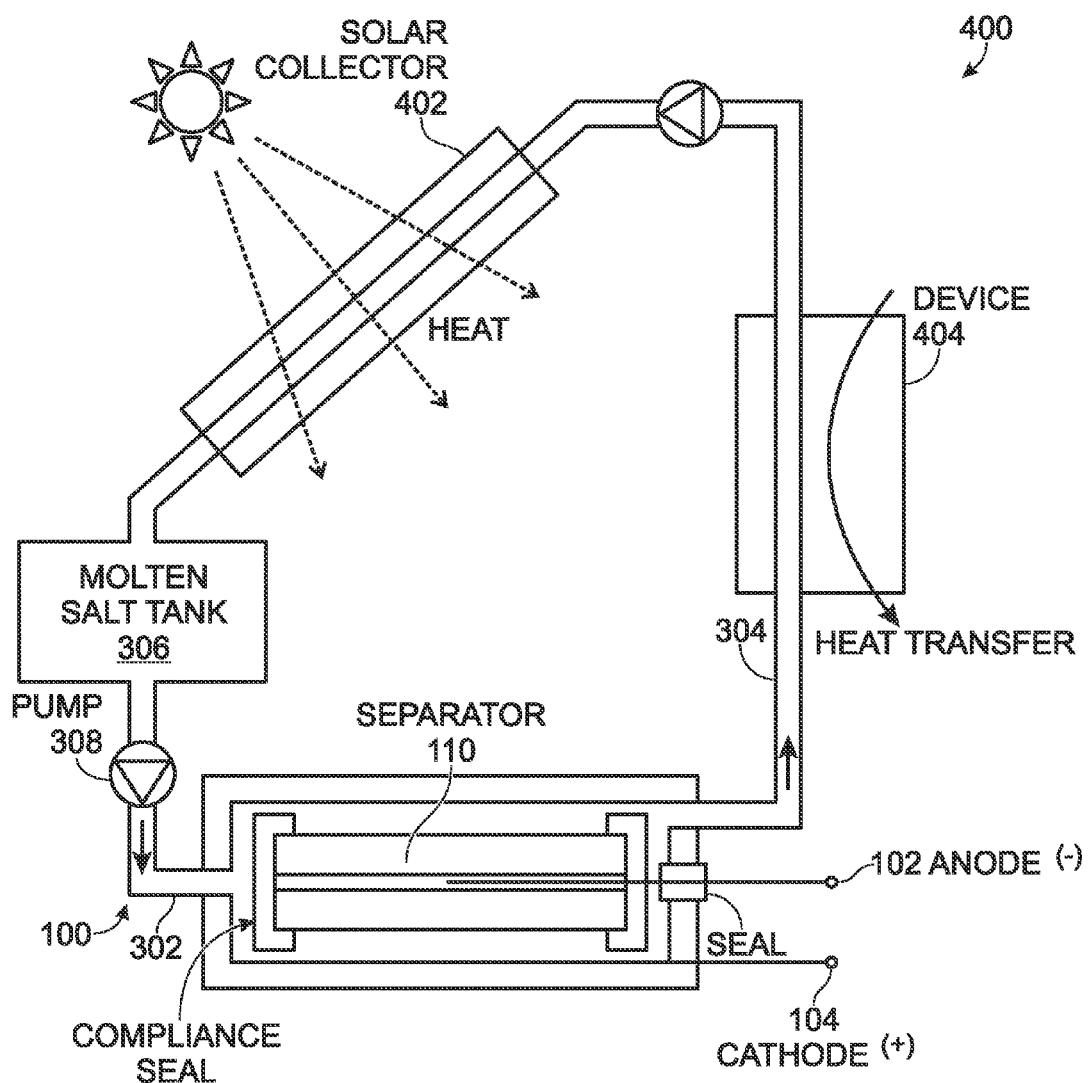
FIG. 4 is a schematic block diagram depicting a variation of the LTMS battery with flow-through cathode.

FIG. 4 is a schematic block diagram depicting a variation of the LTMS battery with flow-through cathode. The LTMS battery 100 can be used as a component in a system to improve the overall efficiency of energy utilization. For example, the LTMS battery 100 has application in a system 400 with a solar thermal panel 402 as shown. The energy collected by the solar thermal panel 402 may not only heat the LTMS to enable a heat transfer device 404, but also heat the molten salts 106 for the LTMS battery 100. The combined system 400 demonstrates a new way to efficiently utilize energy. Alternatively, the heat exchanger 404 may heat the LTMS 106, if necessary, during periods of low solar energy.

Functional Description

The molten salts serve two functions. One is the role of an active material(s) for the cathode in the metal-ion batteries. The other is to function as the electrolyte to transport metal-ions. The LTMS materials include the redox couples that realize the electrochemical reactions in the charge/discharge process of the batteries. The potentials of the redox couples determine the voltages of the batteries. For example, a Li/Fe(NO$_3$)$_3$.9H$_2$O molten salt battery exhibits a theoretical voltage of 3.81 volts. Due to the liquid state of the molten salts, metal-ions can readily move into the salts, in light of this, no additional electrolyte is needed at the cathode side to transport metal-ions.

The molten salts have a larger capacity than an aqueous cathode. As for the aqueous cathode, high amounts of water significantly reduce the capacities of such a cathode material. For example, the maximum capacity of the Fe(CN)$_6^{3-}$ aqueous cathode is 25.8 mAh/g, while for a low temperature molten salt of FeCl$_3$.6H$_2$O, the maximum capacity is 99.2 mAh/g.

The molten salts also have advantages over the slurry electrode materials in metal-ion batteries. The molten salts as electrode materials demonstrate higher energy efficiencies than the slurry. The electrochemical reactions for the molten salts proceed in the liquid (molten salts)-solid (current collector) interface. In contrast, the reactions have to appear on the triple phase boundaries (TPB) of solid (particles in the slurry)-solid (current collector)-liquid (electrolyte) for the slurry electrode. The small contact area between the current collector and solid particles in the slurry leads to both sluggish kinetics for the electrochemical reactions and irreversible metal-ions intercalation. Moreover, the solid particles in slurry are readily distorted through interactions with metal-ions during the charge/discharge process, which limits the cycle life of the electrode. Furthermore, the slurry has a high viscosity. Forcing the slurry to move in the batteries causes a high loss of parasitic energy. On the other hand, LTMS electrode materials have no such problems.

The liquid state of molten salts adds flexibility to the overall design for metal-ion batteries. LTMS cathode materials can be used in the batteries with conventional structures. The LTMS cathode is sealed in a cell with an anode separated by a metal-ion permeable separator. The flowable molten salts can be used in the flow-through batteries, which increase the energy of the batteries.

LTMS metal-ion batteries can be combined with other devices to constitute a system to realize both energy storage and conversion with high energy efficiency. For example, a LTMS metal-ion battery can be connected to a solar thermal panel in a system where the solar thermal panel collects the heat from the sun and heats the molten salts for the LTMS metal-ion battery. Advantageously, the system not only utilizes thermal energy, but also stores energy in the form of electrical power.

Molten salts constitute a large number of compounds that may include both organic and inorganic chemicals. However, to function as electrode materials in batteries, the molten salts must contain reversible redox couples that ultimately determine the voltages of the LTMS metal-ion batteries, in the charge/discharge process, the redox couples are oxidized or reduced when metal-ions and electrons move between the anode and cathode. For example, a LTMS of Fe(NO$_3$)$_3$.9H$_2$O has the redox couple of Fe$^{3+/2+}$. As the cathode in a Li/Fe(NO$_3$)$_3$.9H$_2$O battery, Fe$^{3+}$ is reduced to Fee in the discharge process. The theoretical voltage of the battery is 3.81 volts. Table 1 lists some representative salts whose melting points are below 100° C. The LTMS electrode materials are not limited to only these salts, but they can also be metallic-organics or organic compounds. If the redox couples exhibit low potentials, their corresponding molten salts may also be used as the anode materials in batteries.

TABLE 1

Properties of LTMS as the electrode materials.

| Compound | Redox Couple | Potential (V) vs. Li/Li$^+$ | Molecular weight (g/mol) | Specific capacity (mAh/g) |
|---|---|---|---|---|
| Mn(NO$_3$)$_3$•6H$_2$O | Mn$^{3+/2+}$ | 4.54 | 349.07 | 76.79 |
| Mn(NO$_3$)$_2$•4H$_2$O | | | 251.03 | 106.78 |
| MnCl$_2$•4H$_2$O | | | 197.92 | 135.44 |
| FeBr$_3$•6H$_2$O | Fe$^{3+/2+}$ | 3.81 | 403.68 | 66.40 |
| KFe(SO$_4$)$_2$•12H$_2$O | | | 503.31 | 53.26 |
| FeCl$_3$•6H$_2$O | | | 270.32 | 99.16 |
| Fe(NO$_3$)$_3$•9H$_2$O | | | 404.04 | 66.34 |
| FeCl$_3$•2H$_2$O | | | 198.24 | 135.22 |
| Fe(NO$_3$)$_2$•6H$_2$O | | | 287.98 | 93.08 |
| FeSO$_4$•7H$_2$O | | | 278.05 | 96.41 |
| CoSO$_4$•7H$_2$O | Co(H$_2$O)$_6^{3+/2+}$ | 4.96 | 281.14 | 95.35 |
| Co(NO$_3$)$_2$•6H$_2$O | | | 291.06 | 92.10 |

Figure 5:
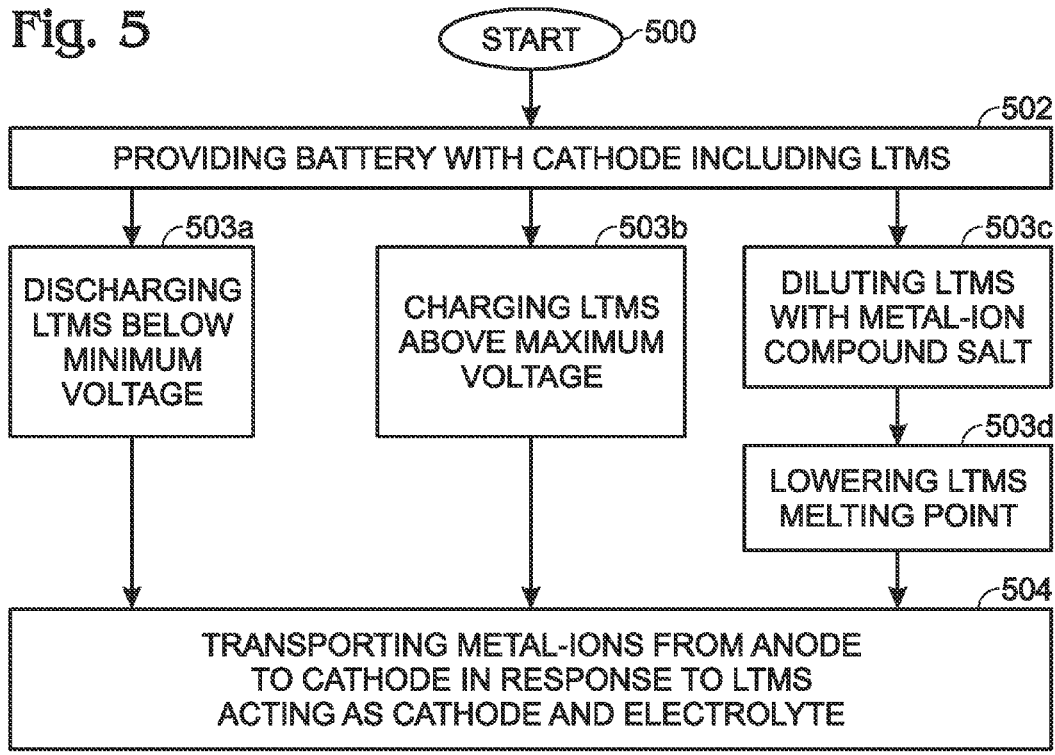
FIG. 5 is a flowchart illustrating a method for transporting metal-ions in a battery using a LTMS.

FIG. 5 is a flowchart illustrating a method for transporting metal-ions in a battery using a LTMS. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 500.

Step 502 provides a battery comprising an anode, a cathode including LTMS having a liquid phase at a temperature of less than 150° C., a current collector submerged in the LTMS, and a metal-ion permeable separator interposed between the LTMS and the anode. As noted above, some examples of LTMS include Mn(NO$_3$)$_3$.6H$_2$O, Mn(NO$_3$)$_2$.4H$_2$O, MnCl$_2$.4H$_2$O, FeBr$_3$.6H$_2$O, KFe(SO$_4$)$_2$.12H$_2$O, FeCl$_3$.6H$_2$O, Fe(NO$_3$)$_3$.9H$_2$O, FeCl$_3$.2H$_2$O, Fe(NO$_3$)$_2$.6H$_2$O, FeSO$_4$.7H$_2$O, CoSO$_4$.7H$_2$O, Co(NO$_3$)$_2$.6H$_2$O, Ni(NO$_3$)$_2$.6H$_2$O, Cd(NO$_3$)$_2$.4H$_2$O, and Cd(NO$_3$)$_2$.H$_2$O.

Step 504 transports metal-ions from the separator to the current collector in response to the LTMS acting simultaneously as a cathode and an electrolyte. In one aspect, Step 504 creates a liquid flow of LTMS interacting with the current collector and separator. If Step 502 provides a cathode including an internal compartment with the separator and current collector, and a connected reservoir, then Step 504 creates a liquid flow of LTMS between the internal compartment and the reservoir.

In one aspect, if Step 503a discharges the LTMS below a minimum threshold voltage. Then, Step 504 flows LTMS between the internal compartment and the reservoir in response to the minimum threshold voltage. In another aspect, if Step 503b) charges the LTMS above a maximum threshold voltage. Then, Step 504 flows LTMS between the internal compartment and the reservoir in response to the maximum threshold voltage.

In a different aspect, Step 503c dilutes the LTMS with a salt including a metal-ion compound. In response to the metal-ion compound salt, Step 503d reduces the melting temperature of the LTMS. Some examples of metal-ion compound salts include $MNO_3$, MCl, and $M_2SO_4$, where M is a metal. That is, the metal-ion compound salt may be $LiNO_3$, LiCl or $Li_2SO_4$ for a battery with a Li metal anode, or $NaNO_3$, NaCl or $Na_2SO_4$ for a battery with a Na metal anode.

A LTMS battery has been provided along with an associated method for transporting metal-ions using a LTMS. Examples of salt materials and battery structures have been presented to illustrate the invention. However, the invention is not limited to merely these examples. Other variations and embodiments of the invention will occur to those skilled in the art.

We claim:

1. A battery with a low temperature molten salt (LTMS) cathode, the battery comprising:
    an anode configured to accept and release metal-ions;
    a cathode comprising:
        an active material exclusively formed from a LTMS having a liquid phase at a temperature of less than 150° C.;
        a cathode current collector submerged in the LTMS;
        a metal-ion permeable separator interposed between the LTMS and the anode; and,
        wherein the LTMS is, simultaneously with being the cathode active material, an electrolyte transporting metal-ions from the separator to the current collector.

2. The battery of claim 1 wherein the LTMS comprises a redox couple, including a reducing agent and its corresponding oxidizing agent.

3. The battery of claim 1 wherein the cathode is a flow-through cathode, with a liquid flow of LTMS interacting with the current collector and separator.

4. The battery of claim 3 wherein the flow-through cathode includes:
    an internal compartment including the separator and current collector, an input flow port, and an output flow port; and,
    a reservoir connected to the input and output flow ports.

5. The battery of claim 4 further comprising:
    a pump connected between the internal compartment and the reservoir to supply a flow of LTMS.

6. The battery of claim 1 wherein the LTMS is selected from a group consisting of $Mn(NO_3)_3.6H_2O$, $Mn(NO_3)_2.4H_2O$, $MnCl_2.4H_2O$, $FeBr_3.6H_2O$, $KFe(SO_4)_2.12H_2O$, $FeCl_3.6H_2O$, $Fe(NO_3)_3.9H_2O$, $FeCl_3.2H_2O$, $Fe(NO_3)_2.6H_2O$, $FeSO_4.7H_2O$, $CoSO_4.7H_2O$, $Co(NO_3)_2.6H_2O$, $Ni(NO_3)_2.6H_2O$, $Cd(NO_3)_2.4H_2O$, and $Cd(NO_3)_2.H_2O$.

7. The battery of claim 1 wherein the LTMS is diluted with a salt including a metal-ion compound to decrease its melting point.

8. The battery of claim 7 wherein the metal-ion compound salt is selected from a group consisting of $MNO_3$, MCl, and $M_2SO_4$, where M is a metal.

9. The battery of claim 7 wherein the metal-ion compound salt is selected from a group consisting of $LiNO_3$, LiCl and $Li_2SO_4$ for a battery with a Li metal anode, and $NaNO_3$, NaCl and $Na_2SO_4$ for a battery with a Na metal anode.

10. A method for transporting metal-ions using a low temperature molten salt (LTMS) in a battery, the method comprising:
    providing a battery comprising an anode, a cathode comprising an active material formed exclusively from a LTMS having a liquid phase at a temperature of less than 150° C., a current collector submerged in the LTMS, and a metal-ion permeable separator interposed between the LTMS and the anode; and,
    transporting metal-ions from the separator to the cathode current collector in response to the LTMS acting simultaneously as the cathode active material and an electrolyte.

11. The method of claim 10 wherein transporting metal-ions from the separator to the current collector includes creating a liquid flow of LTMS interacting with the current collector and separator.

12. The method of claim 11 wherein providing the battery cathode includes providing an internal compartment with the separator and current collector, and a connected reservoir; and,
    wherein creating a liquid flow of LTMS includes flowing LTMS between the internal compartment and the reservoir.

13. The method of claim 10 wherein the LTMS is selected from a group consisting of $Mn(NO_3)_3.6H_2O$, $Mn(NO_3)_2.4H_2O$, $MnCl_2.4H_2O$, $FeBr_3.6H_2O$, $KFe(SO_4)_2.12H_2O$, $FeCl_3.6H_2O$, $Fe(NO_3)_3.9H_2O$, $FeCl_3.2H_2O$, $Fe(NO_3)_2.6H_2O$, $FeSO_4.7H_2O$, $CoSO_4.7H_2O$, $Co(NO_3)_2.H_2O$, $Ni(NO_3)_2.6H_2O$, $Cd(NO_3)_2.4H_2O$, and $Cd(NO_3)_2.H_2O$.

14. The method of claim 13 further comprising;
    diluting the LTMS with a salt including a metal-ion compound salt; and,
    in response to the metal-ion compound salt, reducing the melting temperature of the LTMS.

15. The method of claim 14 wherein the metal-ion compound salt is selected from a group consisting of $MNO_3$, MCl, and $M_2SO_4$, where M is a metal.

16. The method of claim 15 wherein the metal-ion compound salt is selected from a group consisting of $LiNO_3$, LiCl and $Li_2SO_4$ for a battery with a Li metal anode, and $NaNO_3$, NaCl and $Na_2SO_4$ for a battery with a Na metal anode.

* * * * *

UNITED STATES PATENT AND TRADEMARK OFFICE
CERTIFICATE OF CORRECTION

PATENT NO. : 9,537,192 B2  
APPLICATION NO. : 13/564015  
DATED : January 3, 2017  
INVENTOR(S) : Yuhao Lu et al.

Page 1 of 1

It is certified that error appears in the above-identified patent and that said Letters Patent is hereby corrected as shown below:

In the Claims

In Column 8, Line 44, Claim 13, the fourth to last formula listed in the claim is incorrect. The claim should be printed as follows:

13. The method of claim 10 wherein the LTMS is selected from a group consisting of $Mn(NO_3)_3 \cdot 6H_2O$, $Mn(NO_3)_2 \cdot 4H_2O$, $MnCl_2 \cdot 4H_2O$, $FeBr_3 \cdot 6H_2O$, $KFe(SO_4)_2 \cdot 12H_2O$, $FeCl_3 \cdot 6H_2O$, $Fe(NO_3)_3 \cdot 9H_2O$, $FeCl_3 \cdot 2H_2O$, $Fe(NO_3)_2 \cdot 6H_2O$, $FeSO_4 \cdot 7H_2O$, $CoSO_4 \cdot 7H_2O$, $Co(NO_3)_2 \cdot 6H_2O$, $Ni(NO_3)_2 \cdot 6H_2O$, $Cd(NO_3)_2 \cdot 4H_2O$, and $Cd(NO_3)_2 \cdot H_2O$.

Signed and Sealed this  
Twenty-eighth Day of February, 2017

Michelle K. Lee  
*Director of the United States Patent and Trademark Office*